May 15, 1951 H. WOOD 2,552,914
SUPERREGENERATIVE WAVE-SIGNAL RECEIVER
Filed July 22, 1947
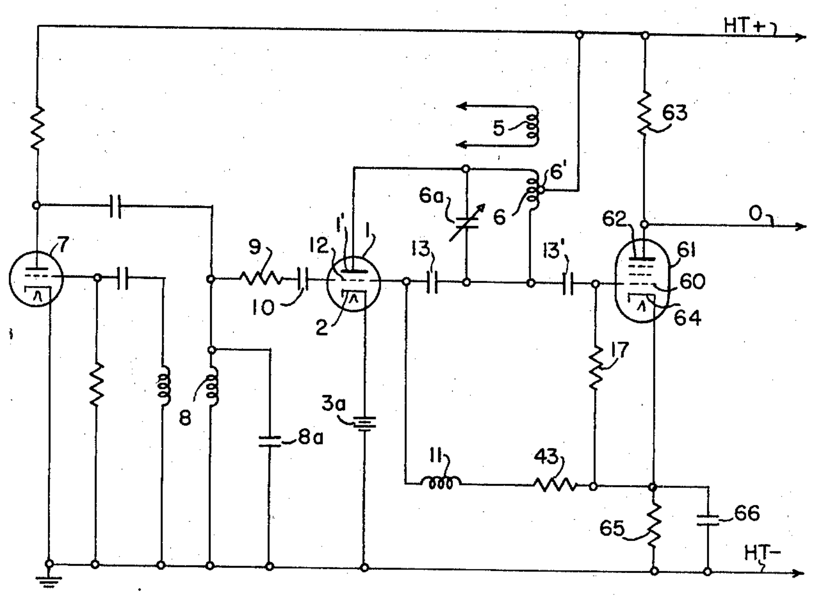
INVENTOR.
HUBERT WOOD
BY John R. Harvey
ATTORNEY Patented May 15, 1951 2,552,914

UNITED STATES PATENT OFFICE 2,552,914

SUPERREGENERATIVE WAVE-SIGNAL RECEIVER

Hubert Wood, Hollinwood, England, assignor to Ferranti Limited, Hollinwood, England, a corporation of Great Britain Application July 22, 1947, Serial No. 762,736
In Great Britain March 16, 1946

Section 1, Public Law 690, August 8, 1946
Patent expires March 16, 1966

6 Claims. (Cl. 250—20)

This invention relates to superregenerative radio receivers and more specifically to such receivers as embody means for controlling sensitivity by variation of the amount of regeneration afforded by the superregeneratively operated valve thereof.

For any given frequency to which such a receiver is tuned there is a specific amount of regeneration necessary to ensure that the receiver is in a condition of required sensitivity as a characteristic of the receiver is altered. By a "characteristic of the receiver" I mean for example the frequency to which the receiver is tuned (which may be variable over a wide range) or the value of the high-tension supply or the aerial loading (which may vary with changing frequency or with moisture deposition). In general the amount of regeneration may be altered by varying the grid-to-cathode bias of the superregenerative amplifying valve in the receiver or by varying the potential of the anode supply to this valve or by varying the degree of coupling between its anode and grid circuits. Where such amplifying valve has an auxiliary electrode the amount of regeneration may be altered by varying the potential applied to this auxiliary electrode.

In common with all radio receivers, superregenerative receivers when in a sensitive condition produce an output containing random voltage fluctuations, due to thermal agitation noise, which cover a wide band of frequencies and which have a varying amplitude. On account of the well-known action of a superregenerative receiver whereby amplification is allowed to occur only during a part of each cycle of the quench-frequency oscillations, the random voltage fluctuations build up during these periods. Thus, ignoring any signal which may be received, the receiver output comprises random voltage fluctuations spread out in frequency over the whole of the pass band of the receiver and having a mean amplitude that increases with the sensitivity of the receiver.

In the copending United States application Serial No. 762,730, filed July 22, 1947, several methods are described for controlling the sensitivity of superregenerative radio receivers as a characteristic is altered, by means of biasing potentials derived from these random voltage fluctuations. Each method, however, necessitates the use of valves in addition to those normally required by the receiver itself.

The main object of the present invention is to provide a superregenerative radio receiver with means for ensuring that the amount of regeneration is automatically varied to maintain constant or nearly constant sensitivity as a characteristic of the receiver is altered, said means not requiring the use of valves other than those needed for the normal operation of the superregenerative receiver.

A superregenerative receiver, in accordance with the present invention, comprises a superregenerative amplifier and means effectively including a modulation-signal detector and a modulation-signal amplifier connected in cascade with the superregenerative amplifier to constitute a modulation-signal channel of the receiver. The modulation-signal amplifier includes a space-current path and includes a passive network in the aforesaid path for developing a control potential having a magnitude that varies with the amplitude of the oscillatory output signal of the superregenerative amplifier. Means are provided in the receiver for utilizing the control potential to control the sensitivity of the superregenerative amplifier, preferably to maintain the sensitivity substantially constant.

For a better understanding of the present invention, together with other and further objects thereof, reference is had to the following description taken in connection with the accompanying drawing the single figure of which shows a superregenerative receiver circuit embodying the features of applicant's invention, and its scope will be pointed out in the appended claims.

By way of illustration the invention will now be described with reference to the accompanying drawing in its application to a superregenerative radio receiver suitable for use in an aircraft for the reception of signals over a wide range of frequencies.

The receiver includes a superregenerative amplifier stage comprising a triode valve 1, forming part of a Hartley-type oscillator, the cathode 2 of the valve being connected to the positive pole of a bias voltage supply 3*a*, the negative pole of which is connected to the earthed negative pole of a high-tension voltage supply. The aerial is coupled by coil 5 to the tuning coil 6 of a tuned circuit of the oscillator, comprising the coil 6 and a parallel tuning condenser 6*a*, the mid-point 6' of the inductance winding being connected to the positive pole of the high-tension supply. A quench-frequency generator is provided consisting of a triode valve 7 connected as a conventional feed-back oscillator operating at a frequency determined by inductance 8 and parallel condenser 8*a*. The high-potential end of inductance winding 8 of this oscillator is joined by way of a resistance 9 and a blocking condenser 10 to the control grid 12 of the superregenerative amplifying valve 1.

One end of the tuned circuit 6, 6a is connected to the anode 1′ of valve 1 while the other end is connected by way of condenser 13 to the grid 12 of the valve and also by way of condenser 13′ to the control grid 60 of pentode valve 61. The cathode 64 of valve 61 is connected to control grid 60 by way of leak resistance 17 and to the negative high-tension supply line by way of the parallel combination of resistance 65 and condenser 66. The values of condenser 13′ and resistance 17 are such as to cause valve 61 to act as a grid-leak detector. The screen and suppressor grids of valve 61 are connected in the usual manner for pentode amplifying valves. Anode 62 of valve 61 is connected to the positive pole of the high-tension supply by way of load resistance 63 and by way of the connection O to further stages of amplification and/or to some device (not shown) for utilizing the received signals.

The above description is of a superregenerative receiver to which the invention may be applied. The receiver may be modified in any suitable known way. For instance, the quench-frequency generator may be of any known form or it may be coupled to the superregenerative amplifier stage in any convenient manner. The latter stage also may be of any known form, such as the self-quenching type in which case a grid leak of suitably high resistance may be connected directly between the control grid and the negative pole of the high-tension supply and the quench oscillator stage omitted.

In applying the invention to the superregenerative radio receiver described above, a connection is made from cathode 64 of valve 61 back to the grid 12 of valve 1 by way of resistance 43 and radio-frequency choke 11.

In operation, the mean positive potential developed across cathode resistance 65 by the flow of the mean anode current is applied as a bias potential to grid 12 of valve 1. The bias voltage supply 3a is such that the mean potential of grid 12 is negative with reference to the potential of cathode 2 by an amount appropriate for proper superregenerative action by valve 1. In the absence of any received signals, periods of radio-frequency oscillation caused by the superregenerative amplification of random "noise" voltage fluctuations and recurrent at quench frequency are applied to grid 60 of valve 61. Owing to the well-known principles of grid-leak detection these oscillations affect the mean anode current inversely, an increase in the amplitude of the oscillations causing a decrease in the value of the mean anode current and vice versa. If, for example, the superregenerative amplifier becomes more sensitive, which may be consequent upon, say, a change in the tuning frequency, the random "noise" voltage oscillations applied to grid 60 develop an increased amplitude. The positive potential of cathode 64 and hence the positive bias voltage fed back to the control grid 12 of valve 1 are, therefore, reduced which reduces the amount of regeneration. This, in turn, leads to a reduction in the amplitude of the random voltage oscillations. The sensitivity of the receiver is thus maintained.

In the above example the valve 61 is regarded, in known manner, as the equivalent of a diode rectifier followed by an amplifying stage. In consequence, a separate diode or other suitable form of rectifier and a following amplifier valve may be used instead of the leaky grid detector shown.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A superregenerative receiver comprising: a superregenerative amplifier; means effectively including a modulation-signal detector and a modulation-signal amplifier connected in cascade with said superregenerative amplifier to constitute a modulation-signal channel of said receiver, said modulation-signal amplifier including a space-current path and including a passive network in said path for developing a control potential having a magnitude that varies with the amplitude of the oscillatory output signal of said superregenerative amplifier; and means for utilizing said potential to control the sensitivity of said superregenerative amplifier.

2. A superregenerative receiver comprising: a superregenerative amplifier including an electron-discharge device having an anode, a cathode and a control electrode; means effectively including a modulation-signal detector and a modulation-signal amplifier connected in cascade with said superregenerative amplifier to constitute a modulation-signal channel of said receiver, said modulation-signal amplifier including a space-current path and including a passive network in said path for developing a control potential having a magnitude that varies with the amplitude of the oscillatory output signal of said superregenerative amplifier; and means for applying said control potential to said control electrode of said discharge device to control the sensitivity of said superregenerative amplifier.

3. A superregenerative receiver comprising: a superregenerative amplifier including an electron-discharge device having an anode, a cathode and a control electrode; means effectively including a modulation-signal detector and a modulation-signal amplifier connected in cascade with said superregenerative amplifier to constitute a modulation-signal channel of said receiver, said modulation-signal amplifier including a network for developing a control potential having a magnitude that varies with the amplitude of the oscillatory output signal of said superregenerative amplifier; and an inductor constituting a radio-frequency choke at the oscillatory frequency of said superregenerative amplifier for applying said control potential to said control electrode of said discharge device to control the sensitivity of said superregenerative amplifier.

4. A superregenerative receiver comprising: a superregenerative amplifier; means effectively including a modulation-signal detector and a modulation-signal amplifier connected in cascade with said superregenerative amplifier to constitute a modulation-signal channel of said receiver, said modulation-signal amplifier including an electron-discharge device having a cathode and a resistance-capacitance network connected to said cathode for developing a control potential having a magnitude that varies inversely with the amplitude of the oscillatory output signal of said superregenerative amplifier; and an inductor constituting a radio-frequency choke at the oscillatory frequency of said superregenerative amplifier coupled to said network and to said superregenerative amplifier for applying said control potential to said superregenerative amplifier to control the sensitivity thereof.

5. A superregenerative receiver comprising: a superregenerative amplifier; means effectively including a modulation-signal detector and a modulation-signal amplifier connected in cascade with said superregenerative amplifier to constitute a modulation-signal channel of said receiver, said modulation-signal amplifier including a cathode and a resistance-capacitance impedance network connected to said cathode for developing a control potential having a magnitude that varies with the amplitude of the oscillatory output signal of said superregenerative amplifier; and means for utilizing said potential to control the sensitivity of said superregenerative amplifier.

6. A superregenerative receiver comprising: a superregenerative amplifier; a grid-leak detector, effectively providing a modulation-signal detector, and a modulation-signal amplifier connected in cascade with said superregenerative amplifier to constitute a modulation-signal channel of said receiver, said modulation-signal amplifier including a network for developing a control potential having a magnitude that varies inversely with the amplitude of the oscillatory output signal of said superregenerative amplifier; and means for utilizing said potential to control the sensitivity of said superregenerative amplifier.

HUBERT WOOD.

REFERENCES CITED

The following references are of record in the file of this patent:

UNITED STATES PATENTS

| Number | Name | Date |
|---|---|---|
| 2,147,595 | Hilferty | Feb. 14, 1939 |
| 2,412,710 | Bradley | Dec. 17, 1946 |
| 2,429,513 | Hansen | Oct. 21, 1947 |
| 2,460,202 | Tyson | Jan. 25, 1949 |

FOREIGN PATENTS

| Number | Country | Date |
|---|---|---|
| 114,153 | Australia | Apr. 24, 1940 |